(12) United States Patent  (10) Patent No.: US 8,970,729 B2
Tsuda  (45) Date of Patent: Mar. 3, 2015

(54) IMAGE CAPTURING APPARATUS, CONTROL METHOD THEREFOR, AND NON-TRANSITORY COMPUTER READABLE STORAGE MEDIUM

(71) Applicant: Canon Kabushiki Kaisha, Tokyo (JP)

(72) Inventor: Yuji Tsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 13/943,903

(22) Filed: Jul. 17, 2013

(65) Prior Publication Data

US 2014/0028871 A1  Jan. 30, 2014

(30) Foreign Application Priority Data

Jul. 25, 2012 (JP) ................................ 2012-165137

(51) Int. Cl.
*H04N 5/222* (2006.01)
*H04N 9/73* (2006.01)
*H04N 9/64* (2006.01)

(52) U.S. Cl.
CPC .................................... *H04N 9/643* (2013.01)
USPC .................................... 348/223.1; 348/333.02

(58) Field of Classification Search
USPC ................................................... 348/333.02
See application file for complete search history.

(56) References Cited

U.S. PATENT DOCUMENTS

| | | | | |
|---|---|---|---|---|
| 6,532,024 | B1* | 3/2003 | Mauger et al. | 715/716 |
| 7,684,096 | B2* | 3/2010 | Gonsalves | 358/518 |
| 8,446,510 | B2* | 5/2013 | Lee et al. | 348/333.12 |
| 2002/0167598 | A1* | 11/2002 | Oeda et al. | 348/223.1 |
| 2008/0192120 | A1* | 8/2008 | Corley | 348/188 |
| 2009/0207273 | A1* | 8/2009 | Shirahama | 348/223.1 |
| 2009/0256907 | A1* | 10/2009 | Faragher | 348/143 |
| 2011/0164817 | A1* | 7/2011 | Ubillos et al. | 382/167 |
| 2013/0201206 | A1* | 8/2013 | Bryant et al. | 345/600 |

FOREIGN PATENT DOCUMENTS

JP  2002-247608 A  8/2002

* cited by examiner

*Primary Examiner* — Albert Cutler
(74) *Attorney, Agent, or Firm* — Cowan, Liebowitz & Latman, P.C.

(57) ABSTRACT

An image capturing apparatus for capturing an object and generate an image, displaying the image, performing signal processing for the image, and accepting an input from a user, wherein the image is displayed with a vectorscope superimposed thereon, the vectorscope indicating a distribution of color components included in the image based on a hue and a color density and an index for specifying a range of a skin color region in the image, a display position of the index on the vectorscope is specified based on the hue and the color density values, and a size of the index is specified by the range of the skin color region value, and processing is performed for decreasing a detail level of an image signal of the image having a color component included in the index.

8 Claims, 9 Drawing Sheets

FIG. 9B

IMAGE CAPTURING APPARATUS, CONTROL METHOD THEREFOR, AND NON-TRANSITORY COMPUTER READABLE STORAGE MEDIUM

BACKGROUND OF THE INVENTION

1. Field of the Invention

The present invention relates to an image capturing apparatus, a control method therefor, and a computer program.

2. Description of the Related Art

In recent years, digital video cameras using randomly accessible recording media such as an optical disk, hard disk drive, and flash memory, in addition to a conventionally known magnetic tape have become widespread as apparatuses for recording videos. Some manufacturers compete against each other in terms of advanced functions and higher performance of such widespread video cameras.

To satisfy user's need to beautifully shoot an object, for example, a function of setting details of image quality adjustment of a video camera body, and a skin detail function as part of the setting function are provided. The skin detail function aims, when shooting the person, to select and set the skin color region of a person, and beautifully represent the skin of the person by decreasing the detail level with respect to the luminance signal within the range of the skin color region. In this case, the user can select and set a color region by selecting numerical values for "hue", "color density", and "range of color region" in the skin color region setting menu of the video camera body.

Furthermore, the user can measure the tint of a video signal by connecting a vectorscope device to the video camera body. There is provided an apparatus which includes the tint measurement function of the vectorscope in a video camera body, and has a waveform display function of facilitating confirmation of the tint of an object by displaying the characteristics of the tint of a video signal on the panel of the video camera (see Japanese Patent Laid-Open No. 2002-247608).

SUMMARY OF THE INVENTION

To select and set the color region of the skin color of an object, the user needs to select and set numerical values for "hue", "color density", and "range of color region" in the skin color region setting menu, the tint of the skin color of an object is different for each person. Furthermore, the tint of the skin color changes depending on the various illumination conditions of the object. Therefore, it is difficult to determine how the "hue", "color density", and "range of color region" of the skin color region setting menu need to be adjusted in order to correctly set a skin color region for the skin color of an object.

The present invention provides a technique of correctly and readily setting a skin color region for the skin color of an object.

One aspect of embodiments of the present invention relates to an image capturing apparatus having an image capturing unit configured to capture an object and generate an image, a display unit configured to display the image, a signal processing unit configured to perform signal processing for the image, and an operation unit configured to accept an input from a user, wherein the display unit displays the image with a vectorscope superimposed thereon, the vectorscope indicating a distribution of color components included in the image based on a hue and a color density and an index for specifying a range of a skin color region in the image, a display position of the index on the vectorscope is specified by a value representing the hue and a value representing the color density, and a size of the index is specified by a value representing the range of the skin color region, the value representing the hue, the value representing the color density, and the value representing the range of the skin color region are set based on the input from the user through the operation unit, and the signal processing unit performs processing of decreasing a detail level of an image signal of the image having a color component included in the index.

Further features of the present invention will become apparent from the following description of exemplary embodiments (with reference to the attached drawings).

DESCRIPTION OF THE EMBODIMENTS

An embodiment of the present invention will be described below with reference to the accompanying drawings.

Figure 1:
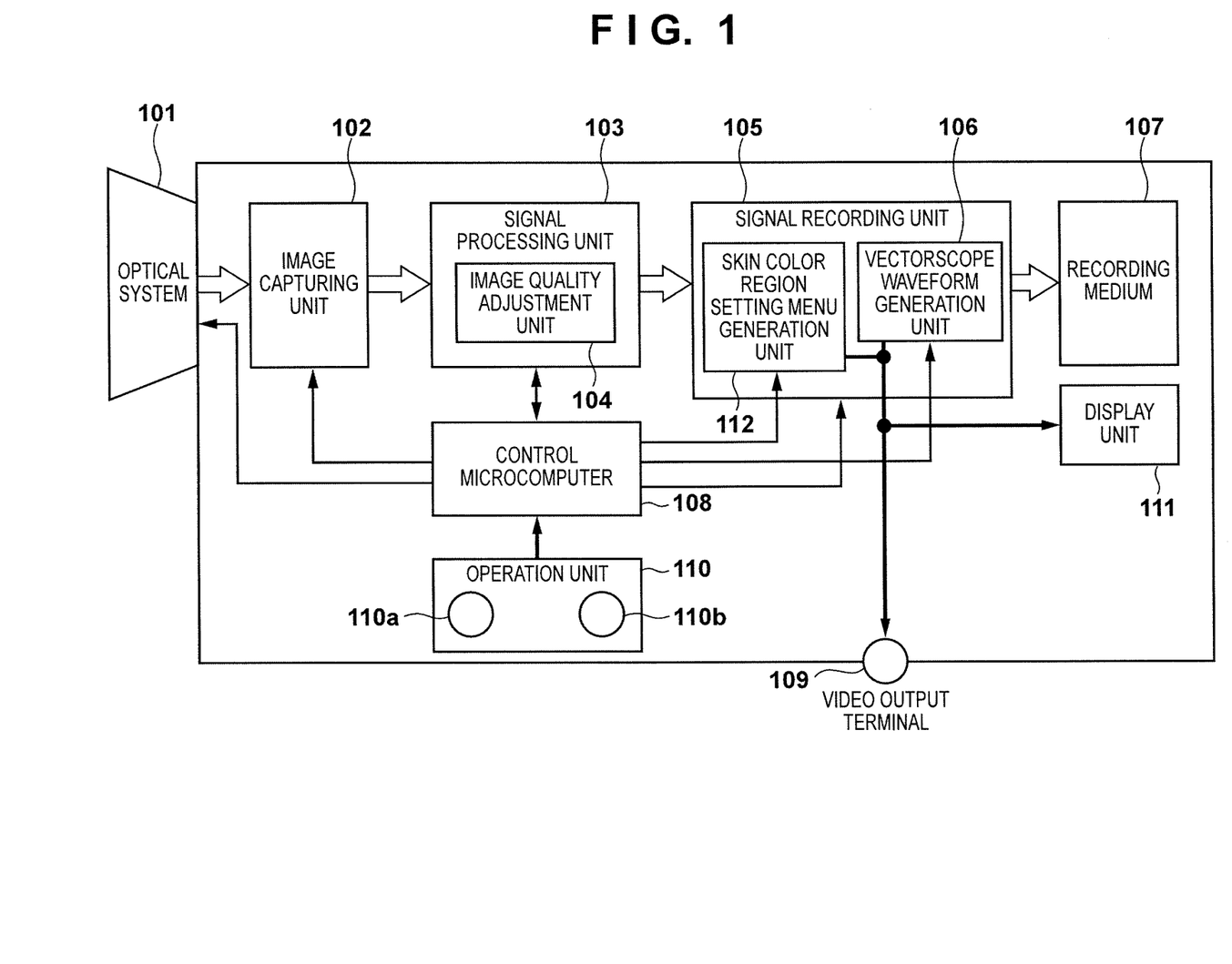
FIG. 1 is a block diagram showing an example of the arrangement of an image capturing apparatus 100 according to an embodiment of the present invention.

FIG. 1 is a block diagram showing an example of the arrangement of an image capturing apparatus 100 according to the embodiment of the present invention. Referring to FIG. 1, an optical system 101 is formed from a zoom lens group, a stop, an ND filter, and the like. An image capturing unit 102 is formed from a CCD serving as an image sensor, a sample and hold circuit (S/H circuit), a preprocess circuit, and the like. A signal processing unit 103 includes an image quality adjustment unit 104, and performs predetermined image processing for a video signal provided by the image capturing unit 102. The image processing includes skin detail processing (to be described later), and processing of superimposing a zebra pattern on a skin color region to undergo the skin detail processing. A signal recording unit 105 performs encoding/decoding processing for an input video signal. The signal recording unit 105 includes a vectorscope waveform generation unit 106 for generating a vectorscope waveform, and a skin color region setting menu generation unit 112 for generating a skin color region setting menu. The signal recording unit 105 controls output of a video signal to a recording medium 107, a video output terminal 109, and a display unit 111. The recording medium 107 is, for example, a flash memory, optical disk, or tape for recording image data provided by the signal recording unit 105.

A control microcomputer 108 controls the whole image capturing apparatus by communicating with the respective functional blocks described above. The video output terminal 109 is used to output a video signal to the external display device of the image capturing apparatus 100. An operation unit 110 includes a switch or button group for accepting an operation input from the user, and includes a skin color region setting menu display switch 110a and a vectorscope waveform display switch 110b. The skin color region setting menu display switch 110a is used to display a menu screen for setting a skin color region. The vectorscope waveform display switch 110b is used to display a vectorscope waveform on the screen. The operation unit 110 includes a switch group for selecting/changing the respective numerical values of "hue", "color density", and "range of color region" in a skin color region setting menu screen 304 shown in FIG. 3C (to be described later). The operation unit 110 can also include a switch for selecting whether to superimpose and display a zebra pattern indicating a skin color region to undergo the skin detail processing.

The skin color region setting menu generation unit 112 generates a skin color region setting menu. The display unit 111 is, for example, a liquid crystal display unit, and displays the vectorscope waveform and skin color region setting menu generated in the signal recording unit 105, and image data recorded in the recording medium.

The practical operation of the image capturing apparatus 100 will now be described. The stop and ND filter adjust the amount of light received from an object via the lenses of the optical system 101. In the image capturing unit 102, an image of the light from the object is formed on the surface of the image sensor such as a CCD, and accumulated as a video signal by performing photoelectric conversion. The video signal output from the image sensor such as a CCD undergoes sample and hold processing in the sample and hold circuit. After that, the video signal is supplied to the preprocess circuit to undergo AGC processing, black balance processing, white balance processing, gamma correction processing, and the like, and then supplied to the signal processing unit 103. The signal processing unit 103 executes image processing such as processing and correction for the video signal based on an instruction from the control microcomputer 108.

The control microcomputer 108 determines adjustment parameters such as gamma, black level, knee-point, sharpness, noise reduction, white balance, and color matrix adjustment parameters based on an instruction from the user, and transfers the determined adjustment parameters to the image quality adjustment unit 104. The image quality adjustment unit 104 adjusts the video signal based on the received adjustment parameters, and outputs the adjusted video signal to the signal recording unit 105. The aforementioned skin detail function is also realized by transferring the numerical values of "hue", "color density", and "range of color region" to the image quality adjustment unit 104, and adjusting the video signal by the image quality adjustment unit 104 based on the received adjustment parameters. The adjusted video signal is output to the signal recording unit 105.

Note that the skin detail processing according to this embodiment decreases the detail level of a skin color region. More specifically, the skin detail processing exemplarily includes processing of decreasing the high-frequency components of a skin color region such as low-pass filtering or smoothing processing, processing of controlling, when generating a detail signal corresponding to the edge portion of an image and performing edge enhancement by adding the detail signal to a color signal, to decrease the level of the detail signal for a skin color region, and processing of controlling, when performing edge enhancement by causing each luminance signal of an image to overshoot in the level direction, not to cause the luminance signal of a skin color region to overshoot in the level direction.

The signal recording unit 105 performs intra-frame encoding and inter-frame encoding for the input video signal, and records the obtained signal in the recording medium 107. The input video signal is also output to the video output terminal 109 or display unit 111. Furthermore, the encoded data recorded in the recording medium 107 is decoded to generate a video signal, which is then output to the video output terminal 109 or display unit 111. If the user operates the vectorscope waveform display switch 110b, the vectorscope waveform generation unit 106 detects a burst signal to generate a reference signal. An R-Y demodulation block and B-Y demodulation block generate an R-Y demodulated signal and B-Y demodulated signal, and plot the R-Y demodulated signal on the Y-axis and the B-Y modulation signal on the X-axis, respectively, thereby generating a vectorscope waveform. The generated vectorscope waveform is superimposed on the video signal, and is then output to an external monitor from the video output terminal 109 or displayed on the display unit 111.

The vectorscope waveform will be explained with reference to FIG. 2. The vectorscope waveform is obtained by arranging two color difference signals (R-Y and B-Y) on the Y- and X-axes, respectively. As the intensity of a color signal is higher, the color difference signal is plotted toward the outer periphery of the scope. As the color difference signal is closer to the center of the scope, the color is closer to an achromatic color. Furthermore, a change in hue can be identified based on the position of each apex.

Figure 2:
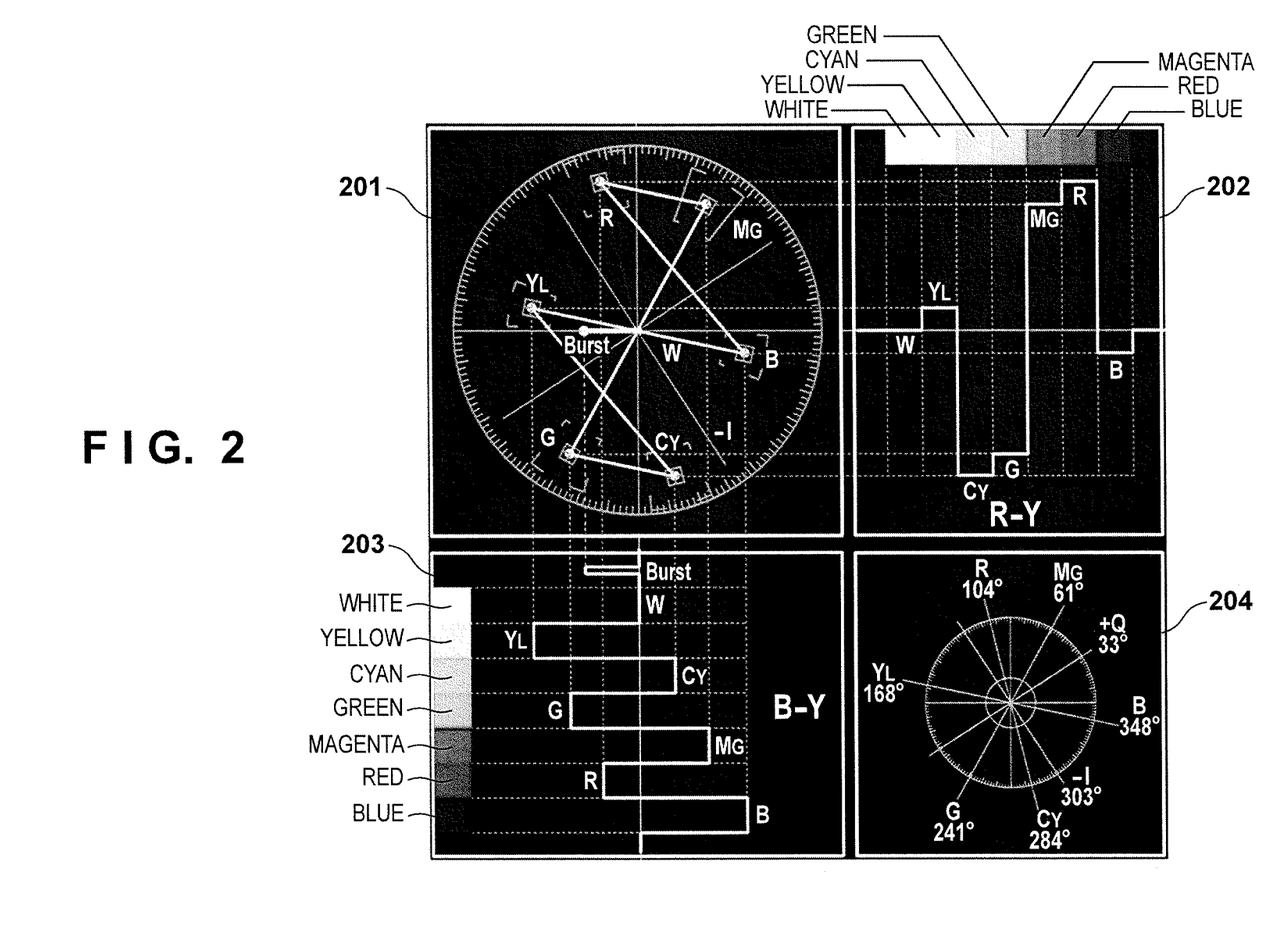
FIG. 2 is a view showing an example of a vectorscope waveform.

A waveform shown within a frame 201 shown in FIG. 2 indicates a vectorscope waveform. FIG. 2 shows an example of a vectorscope waveform obtained by shooting a test pattern formed from W (white), R (red), G (green), B (blue), YL (yellow), CY (cyan), and MG (magenta). In the display region of the frame 201, target boxes indicating indexes of the hue positions of W (white), R (red), G (green), B (blue), YL (yellow), CY (cyan), and MG (magenta) are displayed, and the waveform falls within the boxes. A frame 202 of FIG. 2 shows the R-Y components of W (white), R (red), G (green), B (blue), YL (yellow), CY (cyan), and MG (magenta). A frame 203 shows the B-Y components of W (white), R (red), G (green), B (blue), YL (yellow), CY (cyan), and MG (magenta). Each target box within the frame 201 is at a position reflecting each component value. In a frame 204, the positional relationship between the respective hues on the vectorscope is shown.

Figure 3A:
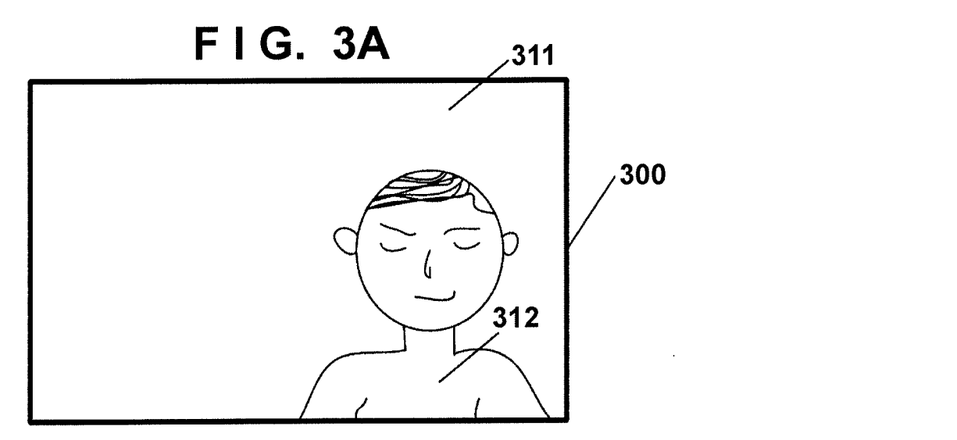
FIGS. 3A, 3B, and 3C are views each showing an example of screen display according to the embodiment of the present invention.
Figure 3B:
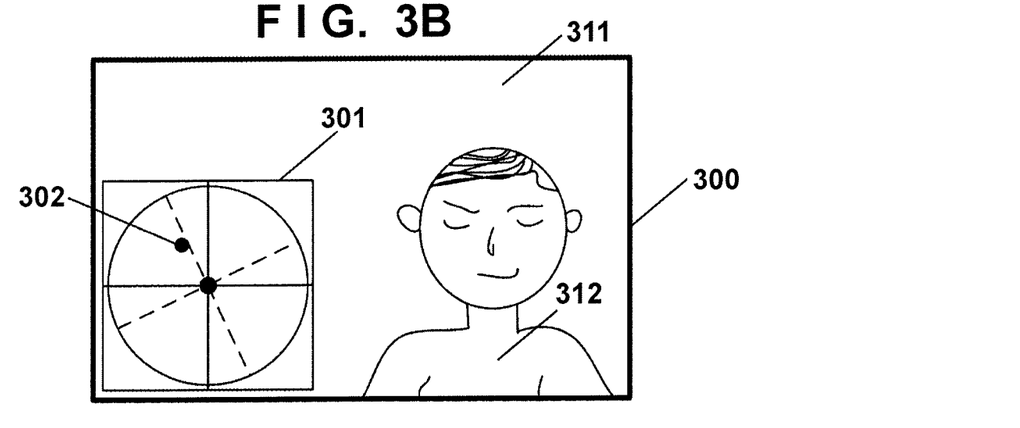

A case in which the user selects and sets the color region of the skin color of an object will be described. FIG. 3A shows an image (an image output from the video output terminal 109) displayed on the display unit 111 when the skin color region setting menu is off. A screen 300 represents a display screen on which an image 311 is displayed. FIG. 3A shows a state in which only the image 311 is displayed on the screen 300. To display a vectorscope waveform in this state, the user operates the vectorscope waveform display switch 110b shown in FIG. 1. If the switch 110b is operated, a vectorscope 301 is generated by the vectorscope waveform generation unit 106 shown in FIG. 1, superimposed on the image 311, and then displayed on the screen 300, as shown in FIG. 3B. In this case, it is possible to check, on the vectorscope 301, the distribution of tint in the whole screen including a person being shot. On the vectorscope 301, points are plotted at positions corresponding to the values of the color difference signals (R-Y and B-Y) of each pixel. In FIG. 3B, for example, a circular region 302 indicates a set of plotted points of skin color components, for the sake of simplicity.

Figure 3C:
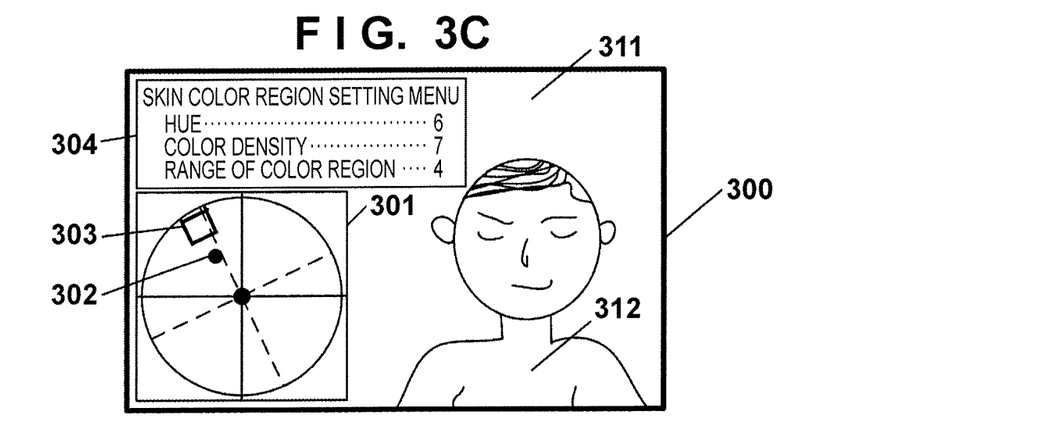

In this state, to set the vectorscope 301 in a non-display state, the user operates the vectorscope waveform display switch 110b shown in FIG. 1 again. If the switch 110b is operated again, only the image 311 is displayed on the screen 300, and the vectorscope 301 is set in a non-display state, as shown in FIG. 3A. To display the skin color region setting menu in the state shown in FIG. 3A, the user operates the skin color region setting menu display switch 110a shown in FIG. 1. If the switch 110a is operated, the skin color region setting menu generation unit 112 generates a skin color region setting menu screen 304, which is then superimposed on the image 311 and displayed on the screen 300, as shown in FIG. 3C. At this time, the vectorscope 301 generated by the vectorscope waveform generation unit 106 is also displayed on the screen 300.

There is the following difference between display contents of the vectorscope 301 of FIG. 3B displayed in response to the operation of the vectorscope waveform display switch 110b and those of the vectorscope 301 of FIG. 3C displayed in response to the operation of the skin color region setting menu display switch 110a. An index (to be referred to as a "skin color region detection marker" hereinafter) 303 for enabling visual determination of a skin color detection region is displayed on the vectorscope 301 shown in FIG. 3C.

The size and display position of the skin color region detection marker 303 are determined when the user selects and sets numerical values for "hue", "color density", and "range of color region" displayed as the selection items of the skin color region setting menu screen 304. The region of the skin color region detection marker 303 is transferred to the image quality adjustment unit 104, which processes the region as a target region of the skin detail processing. Luminance signals belonging to the region undergo processing of decreasing the detail level.

Figure 4:
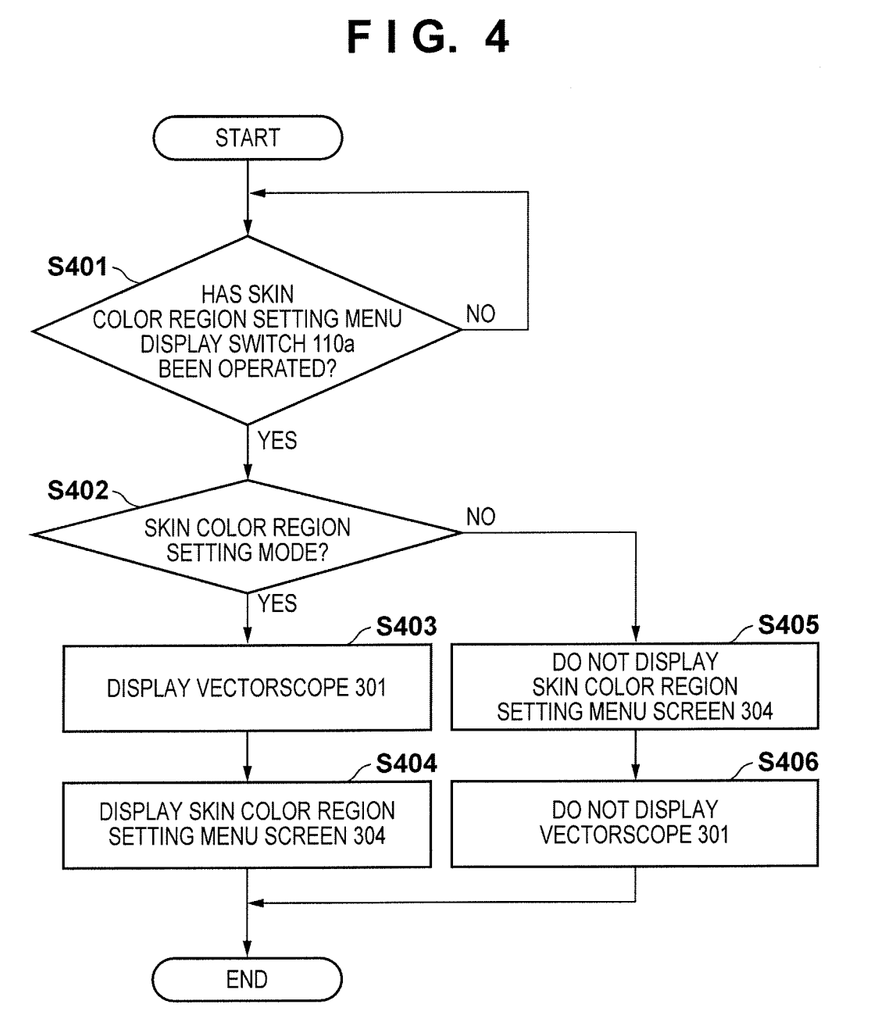
FIG. 4 is a flowchart illustrating processing according to the embodiment of the present invention.

Skin color detection area display processing will be described with reference to a flowchart shown in FIG. 4. This processing is implemented when the control microcomputer 108 executes a corresponding processing program.

In step S401, the control microcomputer 108 determines whether the skin color region setting menu display switch 110a has been operated. If the skin color region setting menu display switch 110a has not been operated, the control microcomputer 108 continues to monitor the operation of the skin color region setting menu display switch 110a. If the skin color region setting menu display switch 110a has been operated ("YES" in step S401), the process advances to step S402. In step S402, the control microcomputer 108 determines whether the current mode is a skin color region setting mode. If the current mode is not the skin color region setting mode ("NO" in step S402), the process advances to step S405. On the other hand, if the current mode is the skin color region setting mode ("YES" in step S402), the process advances to step S403.

In step S403, the control microcomputer 108 controls the signal recording unit 105 to cause the display unit 111 or video output terminal 109 to output the vectorscope 301. A display state in this case is as shown in FIG. 3C. In step S404, the control microcomputer 108 causes the signal recording unit 105 to display the skin color region setting menu screen 304. If the processing exits from the skin color region setting mode, the control microcomputer 108 controls the signal recording unit 105 not to display the skin color region setting menu screen 304 in step S405 and the vectorscope 301 in step S406. A display state in this case is as shown in FIG. 3A.

Figure 5A:
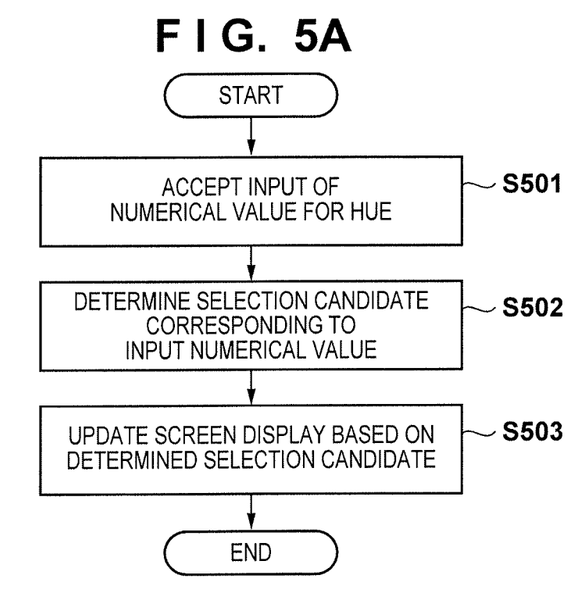
FIGS. 5A and 5B are views for explaining processing of setting a value for "hue" according to the embodiment of the present invention.

A case in which "hue", "color density", and "range of color region" are actually changed in the skin color region setting menu screen 304 shown in FIG. 3C will be described. FIG. 5A is a flowchart when the numerical value ("6" in FIG. 3C) of "hue" is actually changed in the skin color region setting menu screen 304 shown in FIG. 3C. This processing is implemented when the control microcomputer 108 executes a corresponding processing program. In step S501, the control microcomputer 108 accepts input of a numerical value for "hue" from the user through the operation unit 110. The control microcomputer 108 transmits the input numerical value to the signal processing unit 103, and also transmits it to the skin color region setting menu generation unit 112.

The skin color region setting menu generation unit 112 selects a hue corresponding to the input numerical value in step S502, and updates display of the skin color region detection marker 303 and skin color region setting menu screen 304 in step S503. If a zebra pattern is superimposed on an object image 312, display contents of the zebra pattern are updated according to the position of the skin color region detection marker 303. Note that the zebra pattern may be superimposed and displayed in response to the operation of any one of the switches of the operation unit 110.

Figure 5B:
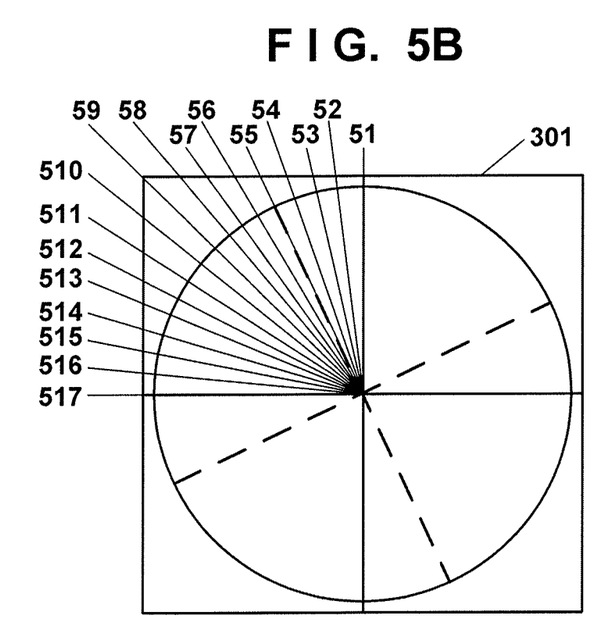

In this embodiment, the numerical value of "hue" is set to fall within the range from 0 to 15, and each value is associated with a hue selection candidate on the vectorscope 301. Each hue has a different phase on the vectorscope. FIG. 5B shows hue selection candidates on the vectorscope 301. In this example, 16 hue selection candidates 51 to 59 and 510 to 517 are prepared. Values of 0 to 7 for "hue" correspond to the selection candidates 51 to 58, and values of 8 to 15 for "hue" correspond to the selection candidates 59 and 510 to 517, respectively.

Note that in FIG. 5B, the hue selection candidates are set within only the range of the second quadrant (the upper left region of the vectorscope 301). This is because the skin color can be considered to exist mostly within this range. Note that the numerical value range of "hue" is not limited to the range from 0 to 15 (4 bits), and may be smaller or larger than this range 4. Furthermore, the number of selection candidates may be larger or smaller than that shown in FIG. 5B depending on the setting of the numerical value range.

Figure 6A:
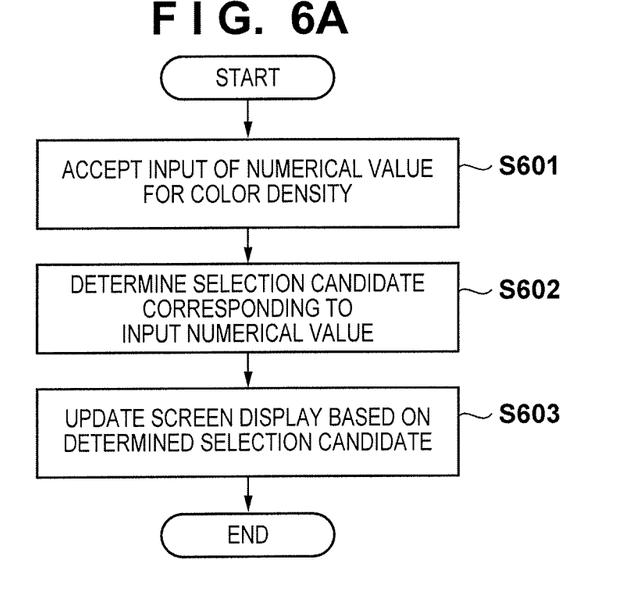
FIGS. 6A and 6B are views for explaining processing of setting a value for "color density" according to the embodiment of the present invention.

Processing when the numerical value ("7" in FIG. 3C) of "color density" is actually changed in in the skin color region setting menu shown in FIG. 3C will now be described with reference to a flowchart shown in FIG. 6A. The processing is implemented when the control microcomputer 108 executes a corresponding processing program. In step S601, the control microcomputer 108 accepts input of a numerical value for "color density" from the user through the operation unit 110. The control microcomputer 108 transmits the input numerical value to the signal processing unit 103, and also transmits it to the skin color region setting menu generation unit 112. After that, the skin color region setting menu generation unit 112 selects a color density corresponding to the input numerical value in step S602, and updates display of the skin color region detection marker 303 and skin color region setting menu screen 304 in step S603. If a zebra pattern is superimposed on the object image 312, display contents of the zebra pattern are updated according to the position of the skin color region detection marker 303.

Figure 6B:
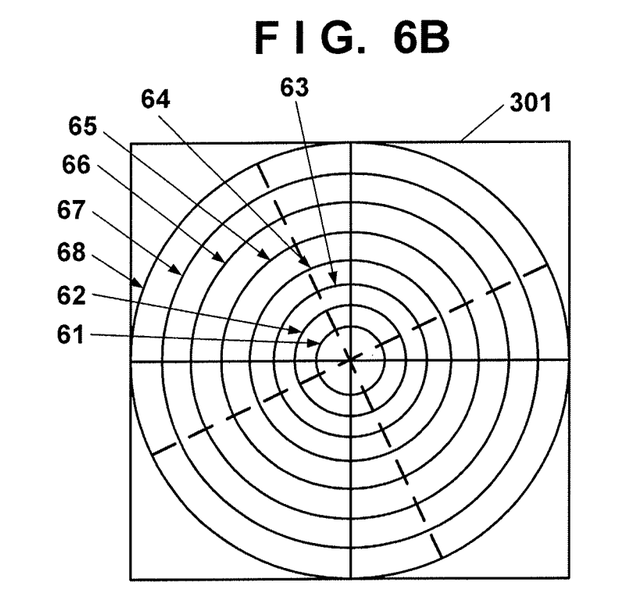

In this embodiment, the numerical value of "color density" is set to fall within the range from 0 to 7, and each value is associated with a color density selection candidate on the vectorscope 301. "Color density" is specified as the distance to the center of the vectorscope 301. FIG. 6B shows color density selection candidates on the vectorscope 301. In this example, 8 color density selection candidates 61 to 68 are prepared. Values of 0 to 7 for "color density" correspond to the selection candidates 61 to 68, respectively. As the numerical value of "color density" is smaller, color is lighter. As the numerical value is larger, color is darker. Note that the numerical value range of "color density" is not limited to the range from 0 to 7 (3 bits), and may be smaller or larger than this range 3. Furthermore, the number of selection candidates may be larger or smaller than that shown in FIG. 6B depending on the setting of the numerical value range.

Figure 7A:
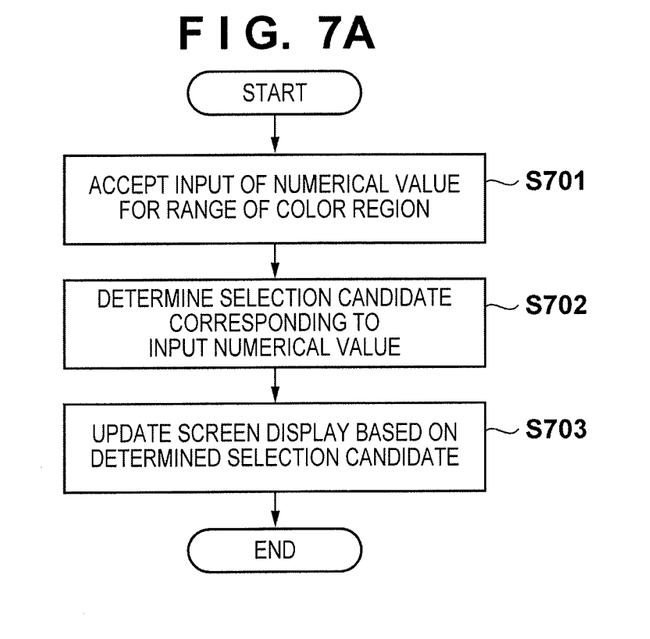
FIGS. 7A, 7B, and 7C are views for explaining processing of setting a value for "range of color region" according to the embodiment of the present invention.

Processing when the numerical value ("4" in FIG. 3C) of "range of color region" is actually changed in the skin color region setting menu shown in FIG. 3C will now be described with reference to a flowchart shown in FIG. 7A. The processing is implemented when the control microcomputer 108 executes a corresponding processing program. In step S701, the control microcomputer 108 accepts input of a numerical value for "range of color region" from the user through the operation unit 110. The control microcomputer 108 transmits the input numerical value to the signal processing unit 103, and also transmits it to the skin color region setting menu generation unit 112.

After that, the skin color region setting menu generation unit 112 selects the range of a color region corresponding to the input numerical value in step S702, and updates display of the skin color region detection marker 303 and skin color region setting menu screen 304 in step S703. If a zebra pattern is superimposed on the object image 312, display contents of the zebra pattern are updated according to the position of the skin color region detection marker 303.

Figure 7B:
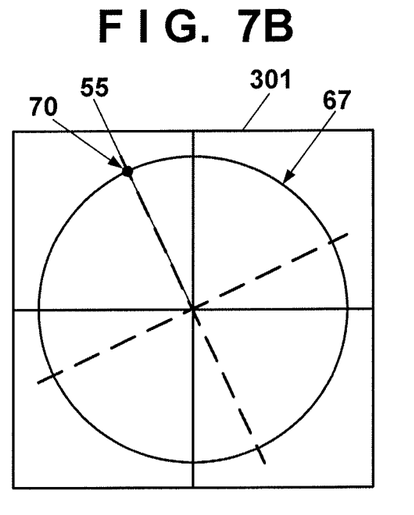
Figure 7C:
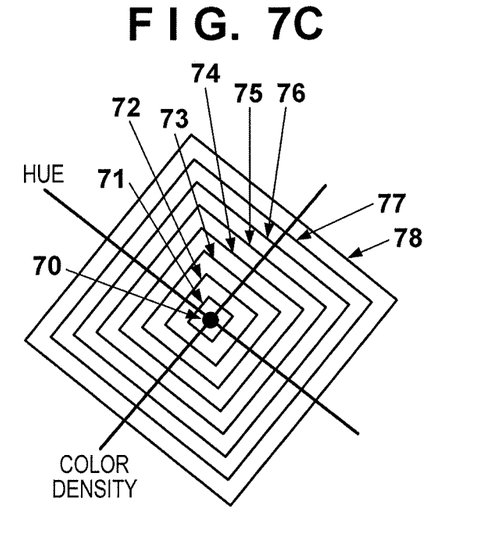

In this embodiment, the numerical value of "range of color region" is set to fall within the range from 0 to 7, and each value is associated with a selection candidate of the range of the color region on the vectorscope 301. FIGS. 7B and 7C are views for explaining selection candidates of the range of the color region on the vectorscope 301.

FIG. 7B is a view for explaining a reference position where the range of the color region is set. A solid line 55 on the vectorscope 301 indicates a selection candidate corresponding to the value "4" of "hue" in FIG. 5B, and a circle 67 indicates a selection candidate corresponding to the value "6" of "color density". A point 70 indicates the intersection point of the solid line 55 and the circle 67, and "range of color region" is set to have the intersection point 70 of "hue" and "color density" as a reference (center) position.

In this embodiment, the numerical value of "range of color region" is set to fall within the range from 0 to 7, and each value is associated with a selection candidate of "range of color region" set to have the intersection point 70 as a center on the vectorscope 301. FIG. 7C shows selection candidates of the range of the color region on the vectorscope. In this example, 7 selection candidates 71 to 78 of the range of the color region are prepared. These candidates have different areas. Values of 0 to 7 for "range of color region" correspond to the selection candidates 71 to 78, respectively. As the numerical value of "range of color region" is smaller, the range is narrower. As the numerical value is larger, the range is wider. Note that the numerical value range of "range of color region" is not limited to the range from 0 to 7 (3 bits), and may be smaller or larger than this range 3. The number of selection candidates may be larger or smaller than that shown in FIG. 7C depending on the setting of the numerical value range. Furthermore, the shape of the color region is not limited to a rectangular shape, and may be any two-dimensional shape such as a circle or ellipse.

Figure 8A:
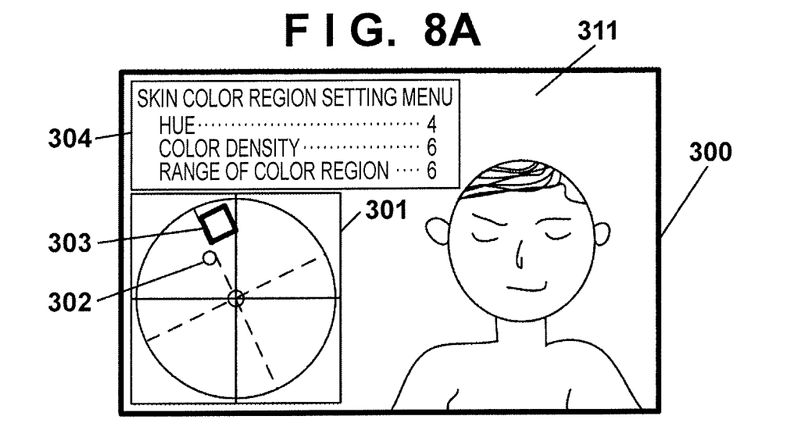
FIGS. 8A, 8B, 8C, and 8D are views for explaining a procedure of adjusting the position of a skin color region detection marker 303 according to the embodiment of the present invention.

Processing of displaying the skin color region detection marker 303 on the skin color region setting menu screen 304 to set a skin color region when capturing a person as an object and performing the skin detail processing for the skin color of the person will be described in detail. An image obtained by capturing a person is assumed to be that shown in FIG. 3A. To execute the skin detail processing so that the skin color of the person as an object look beautiful, the user operates the skin color region setting menu display switch 110a and vectorscope waveform display switch 110b. In response to the operation, the skin color region setting menu screen 304 and vectorscope 301 are displayed. An example of display at this time is as shown in FIG. 8A. In this case, on the skin color region setting menu screen 304, the setting value of "hue" is "4", that of "color density" is "6", that of "range of color region" is "6", and the skin color region detection marker 303 is displayed on the vectorscope 301. On the other hand, the skin color components of the person as an object are displayed at the position of the region 302 on the vectorscope 301. On the vectorscope 301, points are plotted at positions corresponding to the values of the color difference signals (R-Y and B-Y) of each pixel, and the skin color components exist within the region of the second quadrant (upper left region) of the vectorscope 301.

Note that in this embodiment, a simplified image is used as a processing target image for descriptive convenience. In fact, a number of color components may exist, and plotted points may be distributed over a wider range depending on the tints of the image. Since, however, it is possible to estimate positions where skin color components may exist, the user sets values for "hue", "color density", and "range of color region" to include plotted positions where skin color components may exist. With this processing, even if the tint of the skin color of an object is different for each person, or the tint of the skin color changes depending on various illumination conditions of the object, it is possible to appropriately narrow a region to undergo the skin detail processing while performing confirmation using the vectorscope 301.

Figure 8B:
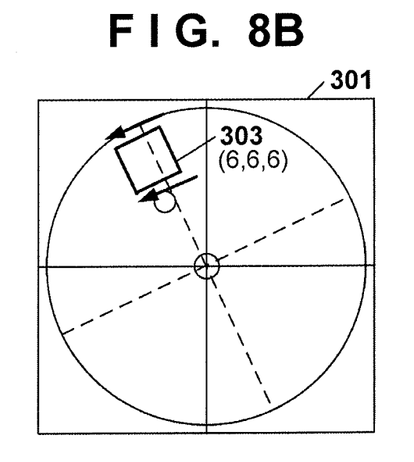

In the example shown in FIG. 8A, the position of the region 302 of the skin color components is different from that of the skin color region detection marker 303 on the vectorscope 301. In this state, the skin of the person does not undergo skin detail processing. To perform the skin detail processing, the user needs to set "hue", "color density", and "range of color region" in the skin color region setting menu to make the position of the skin color region detection marker 303 coincide with that of the region 302 of the skin color components on the vectorscope 301. More specifically, if the value of "hue" is changed from "4" to "5" and from "5" to "6" in the skin color region setting menu, the skin color region detection marker 303 moves in the counterclockwise direction as shown in FIG. 8B. With respect to the display position of the skin color region detection marker 303, the phase on the vectorscope is changed by changing the numerical value of "hue" while keeping the distance to the center of the vectorscope 301 specified by the numerical value of "color density". As a result of setting the value of "hue" to "6", the phase of the region 302 of the skin color components of the object and that of the skin color region detection marker 303 coincide with each other as shown in FIG. 8B. In FIG. 8B, the setting values of "hue", "color density", and "range of color region" at this time are represented by (6, 6, 6).

Figure 8C:
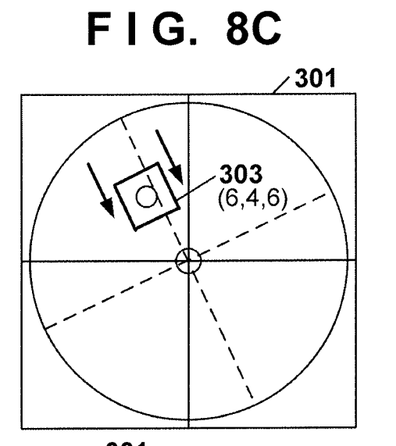

After that, if the value of "color density" is changed from "6" to "5" and from "5" to "4" in the skin color region setting menu, the skin color region detection marker 303 moves toward the center of the vectorscope. In this way, with respect to the display position of the skin color region detection marker 303, the distance to the center of the vectorscope 301 is changed by changing the numerical value of "color density" while maintaining the phase on the vectorscope specified by the numerical value of "hue". As a result of setting the value of "color density" to "4", the center position of the region 302 of the skin color components of the object and that of the skin color region detection marker 303 coincide with each other, as shown in FIG. 8C. In FIG. 8C, the setting values of "hue", "color density", and "range of color region" at this time are represented by (6, 4, 6).

Figure 8D:
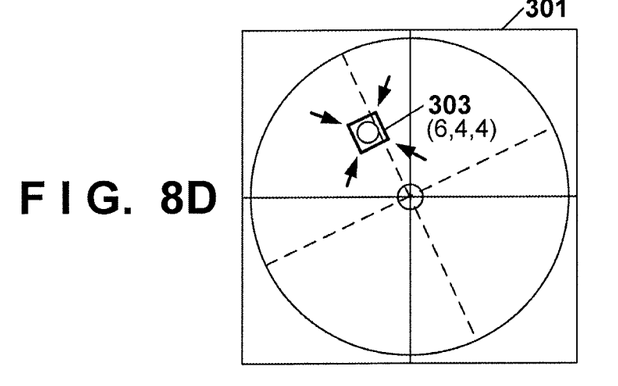

If the value of "range of color region" is changed from "6" to "5" and "5" to "4" in the skin color region setting menu, the size of the skin color region detection marker 303 becomes smaller. As a result of setting the value of "range of color region" to "4", the size of the region 302 of the skin color components of the object is almost equal to that of the skin color region detection marker 303, as shown in FIG. 8D. In FIG. 8D, the setting values of "hue", "color density", and "range of color region" at this time are represented by (6, 4, 4).

Note that if the user wants to set a skin color detection area to have a margin for the skin color components of the person, the size of the skin color region detection marker need only be set sufficiently large for the skin color components of the person. Depending on the illumination conditions of the object, for example, the object may have a bright portion which is illuminated and a dark portion which is shaded. Under such shooting conditions, it becomes possible to set the entire skin of the object as a skin detail processing target by setting a relatively wide skin color detection area. On the other hand, if the user wants to set a minimal skin color detection area for the skin color components of the person, the size of the skin color region detection marker 303 need only be set to be only slightly larger than the region 302 of the skin color components of the person.

Figure 9A:
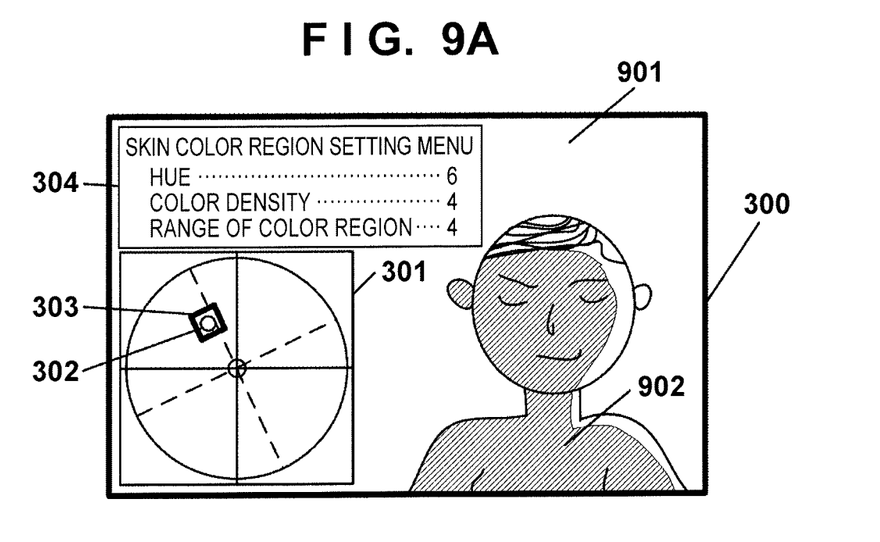
FIGS. 9A and 9B are views for explaining the relationship between the position of the skin color region detection marker 303 and a zebra pattern according to the embodiment of the present invention.
Figure 9B:
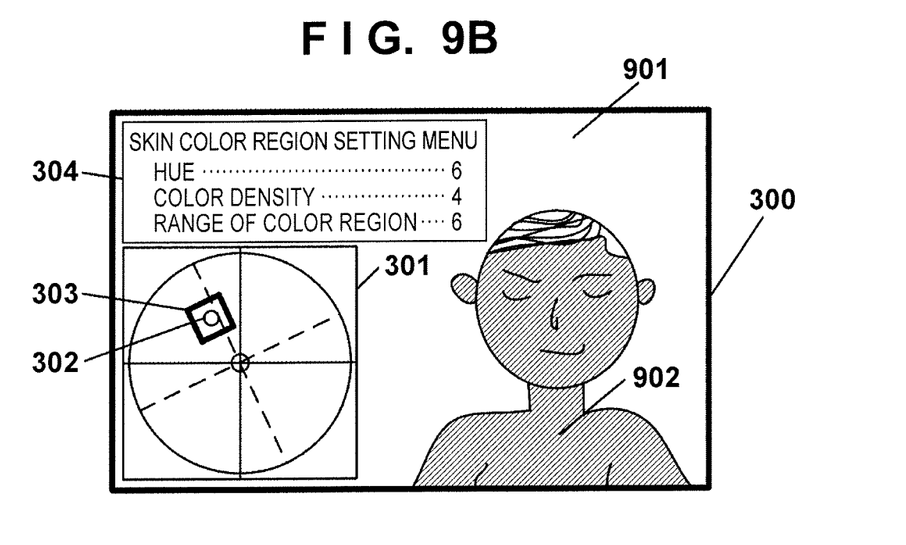

The result set by the skin color region detection marker 303 may be explicitly indicated by, for example, a zebra pattern to the user. The zebra pattern indicates a region specified by pixels included within the range of the skin color region detection marker, which is hatched in the image. Each of FIGS. 9A and 9B shows an example of display of the zebra pattern. Assume that in an image 901, the tint of the skin color of an object is different depending on a position under the influence of illumination conditions. A hatched region 902 indicates a zebra pattern superimposed on the object. If "range of color region" is set narrow, the zebra pattern 902 is not superimposed on part of the object, as shown in FIG. 9A. To the contrary, it is possible to superimpose the zebra pattern 902 on the entire object by setting "range of color region" wide, as shown in FIG. 9B.

According to the aforementioned processing of the embodiment, it is possible to set the position and size of the skin color region detection marker 303 so as to appropriately cover the skin color region of the object by referring to the vectorscope 301. It is thus possible to readily and appropriately select numerical values for "hue", "color density", and "range of color region" on the skin color region setting menu screen 304.

Especially, the user can visually identify the positional relationship between a region where skin color components exist and a region to undergo the skin detail processing using the vectorscope 301. Therefore, the user can intuitively understand which of "hue", "color density", and "range of color region" of the skin color region setting menu screen 304 is to be set, thereby reducing the difficulty in setting. This particularly makes it possible to appropriately cope with a difference in tint of the skin color of an object between individuals and various illumination conditions of the object.

Using the skin color region detection marker 303 makes it easy to identify how much margin the set range of the color region has. Sharing a zebra pattern enables the user to efficiently set a color region. Since the position and size of the skin color region detection marker 303 on the vectorscope 301 represent the numerical values of "hue", "color density", and "range of color region", the skin color region detection marker 303 can strongly present an adjustment method to the user.

Although the present invention has been described in detail based on the embodiment, the present invention is not limited to the specific embodiment, and includes various modes without departing from the spirit and scope thereof. Parts of the above-described embodiment may be combined, as needed.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-165137, filed on Jul. 25, 2012, which is hereby incorporated by reference herein in its entirety.

What is claimed is:
1. An image capturing apparatus comprising:
an image capturing unit configured to capture an object and generate an image;
a display unit configured to display the image;
a signal processing unit configured to perform signal processing for the image; and
an operation unit configured to accept an input from a user,
wherein said display unit displays the image with a vectorscope superimposed thereon, the vectorscope indicating a distribution of color components included in the image based on a hue and a color density and an index for specifying a range of a skin color region in the image,
a display position of the index on the vectorscope is specified by a value representing the hue and a value representing the color density, and a size of the index is specified by a value representing the range of the skin color region,
the value representing the hue, the value representing the color density, and the value representing the range of the skin color region are set based on the input from the user through said operation unit, and
said signal processing unit performs processing of decreasing a detail level of an image signal of the image having a color component included in the index.

2. The apparatus according to claim 1, wherein said display unit displays an image on which a pattern for specifying a region of the signal of the color component included in the index, that is to undergo the processing of decreasing the detail level, is superimposed.

3. The apparatus according to claim 1, wherein a phase of the display position of the index on the vectorscope is changed by changing the value representing the hue while keeping a distance from the display position of the index to a center of the vectorscope, which is specified by the value representing the color density.

4. The apparatus according to claim 1, wherein a distance from the display position of the index to a center of the vectorscope is changed by changing the value representing the color density while maintaining a phase of the display position of the index on the vectorscope, which is specified by the value representing the hue.

5. The apparatus according to claim 1, wherein the index has a two-dimensional shape and an area of the two-dimensional shape is changed by changing the value representing the range of the skin color region.

6. The apparatus according to claim 1, wherein said display unit displays the image with the value representing the hue, the value representing the color density, and the value representing the range of the flesh color region, further superimposed thereon.

7. A control method for an image capturing apparatus including
- an image capturing unit configured to capture an object and generate an image,
- a display unit configured to display the image,
- a signal processing unit configured to perform signal processing for the image, and
- an operation unit configured to accept an input from a user, the method comprising the steps of:
- causing the display unit to display the image with a vectorscope superimposed thereon, the vectorscope indicating a distribution of color components included in the image based on a hue and a color density and an index for specifying a range of a skin color region in the image; and
- causing the signal processing unit to perform processing of decreasing a detail level of an image signal of the image having a color component included in the index,
- wherein a display position of the index on the vectorscope is specified by a value representing the hue and a value representing the color density, and a size of the index is specified by a value representing the range of the skin color region, and
- the method further comprises the step of causing the operation unit to accept the input from the user for setting the value representing the hue, the value representing the color density, and the value representing the range of the skin color region.

8. A non-transitory computer readable storage medium storing a program for causing an image capturing apparatus including
- an image capturing unit configured to capture an object and generate an image,
- a display unit configured to display the image,
- a signal processing unit configured to perform signal processing for the image, and
- an operation unit configured to accept an input from a user, to execute the steps of
- causing the display unit to display the image with a vectorscope superimposed thereon, the vectorscope indicating a distribution of color components included in the image based on a hue and a color density and an index for specifying a range of a skin color region in the image, and
- causing the signal processing unit to perform processing of decreasing a detail level of an image signal of the image having a color component included in the index,
- wherein a display position of the index on the vectorscope is specified by a value representing the hue and a value representing the color density, and a size of the index is specified by a value representing the range of the skin color region, and
- the program further causes the image capturing apparatus to execute the step of causing the operation unit to accept the input from the user for setting the value representing the hue, the value representing the color density, and the value representing the range of the skin color region.

* * * * *